United States Patent
Hyung et al.

(10) Patent No.: US 10,777,786 B2
(45) Date of Patent: Sep. 15, 2020

(54) ELECTRICAL FEEDTHROUGHS FOR BATTERY HOUSINGS

(71) Applicant: Apple Inc., Cupertino, CA (US)

(72) Inventors: YooEup Hyung, San Jose, CA (US); Victor W. Santini, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/723,174

(22) Filed: Dec. 20, 2019

(65) Prior Publication Data

US 2020/0161604 A1 May 21, 2020

Related U.S. Application Data

(63) Continuation of application No. 15/267,353, filed on Sep. 16, 2016, now Pat. No. 10,541,391.

(60) Provisional application No. 62/235,083, filed on Sep. 30, 2015.

(51) Int. Cl.
*H01M 2/06* (2006.01)
*H01M 2/30* (2006.01)

(52) U.S. Cl.
CPC ............. *H01M 2/065* (2013.01); *H01M 2/30* (2013.01)

(58) Field of Classification Search
CPC .................................. H01M 2/065; H01M 2/30
See application file for complete search history.

(56) References Cited

U.S. PATENT DOCUMENTS

| | | | |
|---|---|---|---|
| 4,047,292 A | 9/1977 | Shaffer | |
| 4,315,974 A | 2/1982 | Athearn et al. | |
| 4,486,514 A | 12/1984 | Chaney, Jr. | |
| 4,572,877 A | 2/1986 | Botos | |
| 4,672,010 A | 6/1987 | Tucholski et al. | |
| 5,306,581 A | 4/1994 | Taylor et al. | |
| 5,821,011 A | 10/1998 | Taylor et al. | |
| 5,895,414 A | 4/1999 | Sanchez-Zambrano | |
| 7,341,802 B1* | 3/2008 | Ota .................... | H01M 2/0404 174/50.61 |
| 7,488,553 B2 | 2/2009 | Tsukamoto et al. | |
| 7,687,200 B2 | 3/2010 | Jouanneau-Si-Larbi et al. | |
| 9,166,206 B2 | 10/2015 | Kairawicz et al. | |

(Continued)

FOREIGN PATENT DOCUMENTS

WO WO 2015/058010 4/2015

OTHER PUBLICATIONS

Deng, Da, "Li-ion batteries: basics, progress, and challenges," *Energy Science & Engineering*, 2015, vol. 3(5), pp. 385-418.

*Primary Examiner* — Timothy J Thompson
*Assistant Examiner* — Rhadames J Alonzo Miller
(74) *Attorney, Agent, or Firm* — Polsinelli PC

(57) ABSTRACT

Electrical feedthroughs for battery housings are presented. The electrical feedthroughs include a connector, a ceramic insulator, and a terminal. A first seal couples the connector to the ceramic insulator via a first braze alloy. A second seal couples the ceramic insulator to the terminal via a second braze alloy. The electrical feedthroughs can also include a spacer. A first seal couples the connector to the ceramic insulator; a second seal couples the ceramic insulator to the spacer; and the third seal couples the spacer to the terminal. The first seal, the second seal, and the third seal include, respectively, a first braze alloy, a second braze alloy, and a third braze alloy.

20 Claims, 3 Drawing Sheets

(56) References Cited

U.S. PATENT DOCUMENTS

| | | | |
|---|---|---|---|
| 9,616,518 B2 | 4/2017 | Kroll et al. | |
| 9,735,401 B2* | 8/2017 | Kumar | H01M 2/0252 |
| 2001/0046625 A1* | 11/2001 | Ruth, II | H01M 2/027 |
| | | | 429/176 |
| 2002/0136943 A1 | 9/2002 | Warchocki et al. | |
| 2003/0003356 A1* | 1/2003 | Tsukamoto | H01M 2/027 |
| | | | 429/176 |
| 2003/0027038 A1* | 2/2003 | Tsukamoto | H01M 2/0426 |
| | | | 429/122 |
| 2003/0134194 A1 | 7/2003 | Lasater | |
| 2003/0203279 A1* | 10/2003 | Tsukamoto | H01M 2/027 |
| | | | 429/176 |
| 2003/0211386 A1* | 11/2003 | Ruth, II | H01M 2/027 |
| | | | 429/164 |
| 2004/0062985 A1 | 4/2004 | Aamodt et al. | |
| 2004/0101746 A1* | 5/2004 | Ota | H01M 2/06 |
| | | | 429/161 |
| 2005/0003268 A1 | 1/2005 | Scott et al. | |
| 2006/0257730 A1 | 11/2006 | Suzuki et al. | |
| 2006/0292444 A1 | 12/2006 | Chiang et al. | |
| 2007/0225771 A1* | 9/2007 | Wegrzyn, III | A61N 1/3754 |
| | | | 607/36 |
| 2009/0239141 A1 | 9/2009 | Freitag et al. | |
| 2009/0259265 A1* | 10/2009 | Stevenson | A61N 1/0556 |
| | | | 607/2 |
| 2010/0316896 A1 | 12/2010 | Van Schyndel et al. | |
| 2013/0316201 A1 | 11/2013 | Tanaka et al. | |
| 2013/0330604 A1* | 12/2013 | Kroll | B23K 1/19 |
| | | | 429/179 |
| 2013/0337316 A1* | 12/2013 | Kroll | C03C 29/00 |
| | | | 429/181 |
| 2014/0272566 A1* | 9/2014 | Kylyvnyk | H01M 4/64 |
| | | | 429/211 |
| 2014/0295255 A1* | 10/2014 | Kumar | H01M 2/0252 |
| | | | 429/174 |
| 2014/0295258 A1* | 10/2014 | Kumar | H01M 2/0252 |
| | | | 429/185 |
| 2015/0340742 A1* | 11/2015 | Kumar | H01M 10/3963 |
| | | | 428/632 |
| 2016/0271728 A1 | 9/2016 | Dai et al. | |
| 2017/0018811 A1* | 1/2017 | Bradwell | H01M 2/065 |

* cited by examiner

ELECTRICAL FEEDTHROUGHS FOR BATTERY HOUSINGS

CROSS-REFERENCE TO RELATED APPLICATIONS

This application is a continuation of U.S. patent application Ser. No. 15/267,353, filed Sep. 16, 2016, and entitled "ELECTRICAL FEEDTHROUGHS FOR BATTERY HOUSINGS," which claims the benefit of U.S. Provisional Application Ser. No. 62/235,083, filed Sep. 30, 2015, and entitled "ELECTRICAL FEEDTHROUGHS FOR BATTERY HOUSINGS", each of which is incorporated herein by reference in its entirety.

FIELD

This disclosure relates generally to electrical feedthroughs, and more particularly, to electrical feedthroughs for battery housings.

BACKGROUND

Thin-walled bodies are often used to house batteries owing to their reduced weight. Such reduced weight is particularly desirable in applications involving portable electronics. Electrical feedthroughs are commonly incorporated into thin-walled bodies to provide access to internal battery components. Improvements in such feedthroughs, however, are desired by the battery industry.

SUMMARY

The embodiments described herein relate to electrical feedthroughs for battery housings. In one embodiment, the electrical feedthroughs include a ceramic insulator and a connector for coupling the ceramic insulator to a housing. The electrical feedthroughs also include a terminal disposed within the ceramic insulator. A first seal couples the ceramic insulator to the connector and is formed from a first braze alloy capable of bonding the ceramic insulator and the connector. The electrical feedthroughs additionally include a second seal coupling the ceramic insulator to the terminal. The second seal is formed from a second braze alloy capable of bonding the ceramic insulator and the terminal.

In another embodiment, the electrical feedthroughs involve a plurality of brazed seals. The electrical feedthroughs include a ceramic insulator and a connector for coupling the ceramic insulator to a housing. The electrical feedthroughs also include a terminal disposed within the ceramic insulator. A spacer is disposed between the ceramic insulator and the terminal. The electrical feedthroughs additionally include a first seal coupling the ceramic insulator to the connector. The first seal is formed from a first braze alloy capable of bonding the ceramic insulator and the connector. The electrical feedthroughs also include a second seal coupling the ceramic insulator to the spacer. The second seal is formed from a second braze alloy capable of bonding the ceramic insulator and the spacer. The electrical feedthroughs further include a third seal coupling the terminal to the spacer. The third seal is formed from a third braze alloy capable of bonding the terminal and the spacer.

In an additional embodiment, the electrical feedthroughs involve a glass seal for electrical insulation. The electrical feedthroughs include a connector for coupling to a housing. A terminal is disposed in the connector and formed of a metal selected from the group consisting of titanium, molybdenum, tungsten, and an iron-nickel-cobalt alloy. A seal glass couples the connector to the terminal pin, thereby forming the glass seal. The seal glass includes a boroaluminate glass.

Other electrical feedthroughs are presented.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

Figure 1:
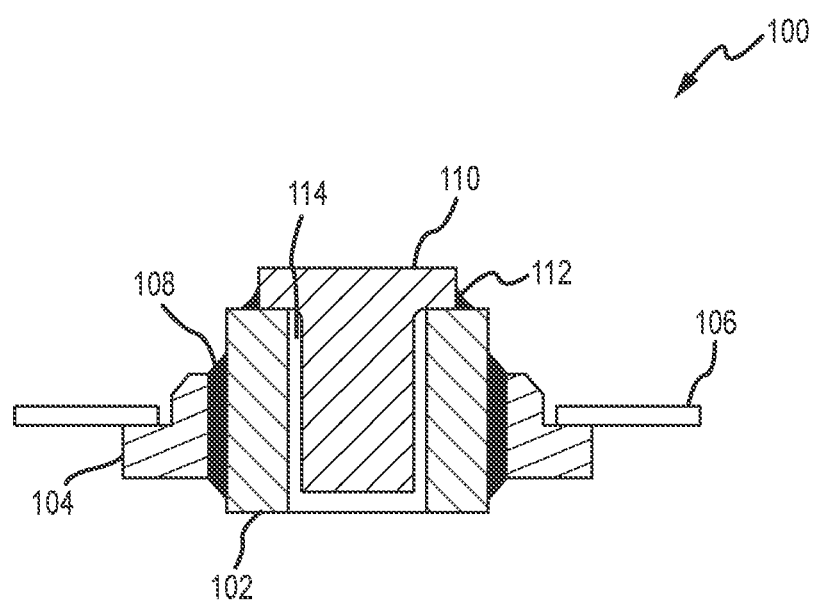
FIG. 1 is a cross-sectional view of an electrical feedthrough, according to an illustrative embodiment.

Referring to FIG. 1, a cross-sectional view is presented of an electrical feedthrough 100, according to an illustrative embodiment. The electrical feedthrough 100 includes a ceramic insulator 102 that may be crystalline, amorphous, or a combination thereof. Non-limiting examples of the ceramic insulator 102 include an aluminum oxide material, (e.g., $Al_2O_3$), a silicon oxide material (e.g., $SiO_2$), an aluminum silicon oxide material (e.g., $3Al_2O_3.2SiO_2$), a silicon nitride material (e.g., $Si_3N_4$), a titanium oxide material (e.g., $TiO_2$), and a zirconium oxide material (e.g., $ZrO_2$). Other materials for the ceramic insulator 102 are possible. In some embodiments, the ceramic insulator 102 includes an aluminum oxide material. In some embodiments, the ceramic insulator exhibits a resistivity greater than $10^9$ $\Omega$-cm. In some embodiments, such as that shown in FIG. 1, the ceramic insulator 102 is formed as a sleeve.

The electrical feedthrough 100 also includes a connector 104 for coupling the ceramic insulator 102 to a housing 106. In some embodiments, the connector 104 can be shaped to mate with an orifice that traverses the housing 106. Such mating may be assisted by bonding (e.g., soldering, brazing, welding, epoxying, etc.) that hermetically seals the connector 104 to the housing 106. The connector 104 may allow the ceramic insulator 102 to be disposed therein (e.g., formed as a ferrule). In some embodiments, the connector 104 is formed of a stainless steel. In further embodiments, the stainless steel is selected from the group consisting of stainless steel 304, stainless steel 316, a stainless steel 316L, or other 300 series stainless steel. In other embodiments, the connector may be formed of an aluminum. In some embodiments, the connector 104 is coupled to the housing 106.

FIG. 1 depicts the housing 106 as a shell, although this depiction is not intended as limiting. In embodiments where the housing 106 is a shell, the shell may be a stainless steel shell. In further embodiments, the housing 106 contains a battery therein.

A first seal 108 couples the ceramic insulator 102 to the connector 104. The first seal includes a first braze alloy capable of bonding the ceramic insulator 102 to the connector 104. This coupling may involve a hermetic seal between the ceramic insulator 102 to the connector 104. In some embodiments, the first braze alloy is selected from the group consisting of silver alloys and gold alloys. In further embodiments, the first braze alloy incorporates alloying elements that, in total, do not exceed 50 weight percent. For example, and without limitation, the first alloy may be $Ag_{72}Cu_{28}$ (i.e., silver alloys). In another non-limiting example, the first alloy may be $Au_{80}Sn_{20}$ (i.e., gold alloys). Moreover, the silver alloys and the gold alloys are not restricted to alloying elements of, respectively, Cu and Sn. Other alloying elements are possible, including combinations thereof. The alloying elements may enhance a wettability of the first braze alloy to the ceramic insulator 102, the connector 104, or both, during brazing (i.e., during formation of the first seal 108).

The electrical feedthrough 100 also includes a terminal 110 disposed in ceramic insulator 102 via a sleeve hole 114. In FIG. 1, the terminal 110 is depicted as a cylindrically-symmetric pin. However, this depiction is for purposes of illustration only. Other shapes are possible for the terminal 110. In some embodiments, the terminal 110 includes aluminum, which may be a pure metal or an alloy (e.g., aluminum 1100). The terminal 110 is shaped to allow coupling to the ceramic insulator 102 via brazing. By incorporating aluminum, the terminal 110 may exhibit a ductility that can accommodate differentials in thermal expansion during brazing (i.e., differentials in thermal expansion between the terminal 110 and the ceramic insulator 102). In other embodiments, the terminal is formed of a stainless steel. In further embodiments, the stainless steel is selected from the group consisting of stainless steel 304, stainless steel 316, a stainless steel 316L, or other 300 series stainless steel. In some embodiments where the connector 104 is coupled to the housing 106 and a battery is contained in the housing 106, the terminal 110 may be electrically connected to the battery.

A second seal 112 couples the ceramic insulator 102 to the terminal 110. This coupling may seal the ceramic insulator 102 to the terminal 110 hermetically. The second seal 112 is formed from a second braze alloy capable of bonding the ceramic insulator 102 and the terminal 110. The second braze alloy may be selected from the group consisting of an aluminum alloy and a gold alloy. For instances where the second braze alloy is the aluminum alloy, the second braze alloy may incorporate alloying elements that may, in total, range between 5-50 weight percent of the aluminum alloy (e.g., $Al_{88}Si_{12}$). However, other ranges are possible. Non-limiting examples of alloying elements for the aluminum alloy include silicon and germanium. For instances where the second braze alloy is the gold alloy, the second braze alloy may incorporate alloying elements that, in total, do not exceed 50 weight percent. For example, and without limitation, the second alloy may be a gold-tin alloy with tin accounting for less than 50 weight percent (e.g., $Au_{80}Sn_{20}$). Other alloying elements, however, are possible for the gold alloy.

With further reference to FIG. 1, in various embodiments, both second seal 112 and terminal 110 can be formed of alloys having similar bonding temperatures. Without wishing to be limited to a particular theory or mode of action, similar bonding temperatures in second seal 112 and terminal 110 can facilitate bonding of second seal 112 to terminal 110. For example, the bonding temperatures of second seal 112 and terminal 110 can be within 10° C., 20° C., 30° C., 40° C., or 50° C. of each other. Similar bonding temperatures can be found where alloys have the same or similar alloy composition.

In some aspects, both second seal 112 and terminal 110 can be formed of an alloy with the same primary metal component (e.g., aluminum or silver). For example, second seal 112 can both be formed of aluminum alloys. In various additional aspects, second seal 112 can be formed of the same alloy composition as terminal 110. For example, second seal 112 and terminal 110 can both be formed of the same aluminum alloy.

Likewise, first seal 108 and connector 104 can be made of alloys with similar bonding temperatures. In some variations, first seal 108 and connector 104 can be made of alloys with the same primary metal component (e.g., aluminum or silver). In some instances, first seal 108 and connector 104 can be made of the same alloy (e.g., the same aluminum alloy).

In FIG. 1, the electrical feedthrough 100 is depicted as having the connector 104, the ceramic insulator 102, and the terminal 110 in a nested configuration. However, this depiction is not intended as limiting. Other configurations are possible.

In some embodiments, a nickel layer may coat the connector 104, the terminal 110, or both. This coating may be in whole or in part. In further embodiments, a gold layer is disposed on the nickel layer. The gold layer may be disposed over the entire nickel layer or portions thereof.

It will be appreciated that the electrical feedthrough 100 may utilize a first configuration where the connector 104 includes the stainless steel and the terminal 110 includes aluminum or a second configuration where the connector 104 includes aluminum and the terminal 110 includes the stainless steel. In the second configuration, the first seal 108 is formed from the second braze alloy and the second seal 112 is formed from the first braze alloy. Thus, a configuration of materials in the electrical feedthrough 100 is reversible. In FIG. 1, the electrical feedthrough 100 corresponds to the first configuration and the associated disclosure relates to this configuration.

In operation, a first surface of the terminal 110 and a second surface opposite the first surface of the terminal 110 are electrically coupled to, respectively, a current source and a current sink, or vice versa. A voltage gradient between the current source and the current sink induces electrical current to flow through the terminal 110. The terminal 110 is coupled to the connector 104 via the ceramic insulator 102, the first seal 108, and the second seal 112. However, despite this coupling, the ceramic insulator 102 electrically isolates the terminal 110 from the connector 104. Electrical current is therefore constrained to flow through the terminal 110, which is electrically-conductive. It will be appreciated that the connector 104 can be configured to allow incorporation of the electrical feedthrough 100 into thin-walled bodies or shells, such as that depicted in FIG. 1. Such thin-walled bodies or shells may be applicable to batteries where low weight is desired. A thin-walled body means that the ratio of the body's thickness to the diameter of the orifice that traverses the housing 106 is 1:10 or less.

Figure 2:
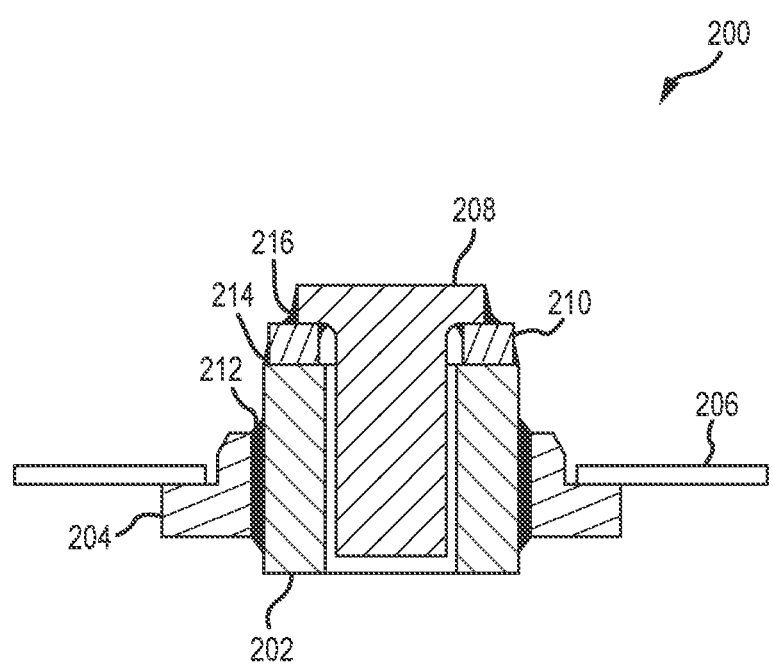
FIG. 2 is a cross-sectional view of an electrical feedthrough having a plurality of brazed seals, according to an illustrative embodiment.

Referring now to FIG. 2, a cross-sectional view is presented of an electrical feedthrough 200 having a plurality of brazed seals, according to an illustrative embodiment. The electrical feedthrough 200 includes a ceramic insulator 202 that may be crystalline, amorphous, or a combination thereof. Non-limiting examples of the ceramic insulator 202 include an aluminum oxide material, (e.g., $Al_2O_3$), a silicon oxide material (e.g., $SiO_2$), an aluminum silicon oxide material (e.g., $3Al_2O_3 \cdot 2SiO_2$), a silicon nitride material (e.g., $Si_3N_4$), a titanium oxide material (e.g., $TiO_2$), and a zirconium oxide material (e.g., $ZrO_2$). Other materials for the ceramic insulator 202 are possible. In some embodiments, the ceramic insulator 202 includes an aluminum oxide material. In some embodiments, the ceramic insulator exhibits a resistivity greater than $10^9$ Ω-cm. In some embodiments, such as that shown in FIG. 2, the ceramic insulator 202 is formed as a sleeve.

The electrical feedthrough 200 also includes a connector 204 for coupling the ceramic insulator 202 to a housing 206. The connector 204, which may be formed of an iron-nickel-cobalt alloy (e.g., Kovar), is shaped to mate with an orifice that traverses the housing 206. Such mating may be assisted by bonding (e.g., soldering, brazing, welding, epoxying, etc.) that hermetically seals the insulator 202 to the body wall. The connector 204 may allow the ceramic insulator 202 to be disposed therein (e.g., formed as a ferrule). In some embodiments, the connector 204 is coupled to the housing 206. FIG. 2 depicts the housing 206 as a shell, although this depiction is not intended as limiting. In embodiments where the housing 206 is a shell, the shell may be a stainless steel shell. In other embodiments, the housing 206 may be an aluminum shell. In further embodiments, the housing 206 contains a battery therein.

The electrical feedthrough 200 additionally includes a terminal 208 disposed within the ceramic insulator 202. In FIG. 2, the terminal 208 is depicted as a cylindrically-symmetric pin. However, this depiction is for purposes of illustration only. Other shapes are possible for the terminal 208. In some embodiments, the terminal 208 includes aluminum, which may be a pure metal or an alloy (e.g., aluminum 1100). In these embodiments, by incorporating aluminum, the terminal 208 may exhibit a ductility that can accommodate differentials in thermal expansion during brazing. In embodiments where the connector 204 is coupled to the housing 206 and the housing 206 contains the battery therein, the terminal 208 may be electrically-coupled to a cathode of the battery.

The electrical feedthrough 200 also includes a spacer 210 disposed between the ceramic insulator 202 and the terminal 208. The terminal 208 traverses the spacer 210, or a portion thereof, to become disposed within the ceramic insulator 202. The spacer 210 may have a spacer hole therethrough. The spacer 210 serves to enable a joint that spans the ceramic insulator 202 and the terminal 208. In some embodiments, the spacer 210 is formed of an iron-cobalt-nickel alloy (e.g., Kovar). In further embodiments, the connector 204 is coupled to the housing 206 and the housing 206 contains the battery therein. In these embodiments, the terminal 208 is electrically-coupled to the cathode of the battery A first seal 212 couples the ceramic insulator 202 to the connector 204 and is formed from a first braze alloy capable of bonding the ceramic insulator 202 and the connector 204. This coupling may involve a hermetic seal between the ceramic insulator 202 to the connector 204. Similarly, a second seal 214 couples the ceramic insulator 202 to the spacer 210 and is formed from a second braze alloy capable of bonding the ceramic insulator 202 and the spacer 210. The second seal 214 may hermetically couple the ceramic insulator 202 to the spacer 210. Moreover, a third seal 216 couples the terminal 208 to the spacer 210 and is formed from a third braze alloy capable of bonding the terminal 208 and the spacer 210. Such coupling may seal the terminal 208 to the spacer 210 hermetically. It will be appreciated that the spacer 210 acts as a transition piece between the terminal 208 and the insulator 202. In this capacity, the spacer 210 may accommodate differences in thermal expansion during brazing by offering an intermediate thermal expansion between the ceramic insulator 202 and the terminal 208 (e.g., to prevent cracks, tearing, etc.).

In some embodiments, the first braze alloy, the second braze alloy, and the third braze alloy include a gold alloy. In these embodiments, the gold alloy incorporates alloying elements that, in total, do not exceed 50 weight percent. For example, and without limitation, the gold alloy may incorporate tin in an amount less than 50 weight percent (e.g., $Au_{80}Sn_{20}$). However, other alloying elements are possible, including combinations thereof. The alloying elements of the gold alloy may enhance, during brazing, a wettability of the gold alloy to the insulator 202, the connector 204, the spacer 210, the terminal 208, or combinations thereof. It will be understood that the first braze alloy, the second braze alloy, and the third braze alloy are not restricted to a common composition of the gold alloy. In further embodiments, the spacer 210 is formed of an iron-cobalt-nickel alloy (e.g., Kovar).

In some embodiments, a nickel layer may coat the connector 204, the terminal 208, the spacer 210, or combinations thereof. This coating may be in whole or in part. In further embodiments, a gold layer is disposed over the nickel layer. The gold layer may be disposed over the entire nickel layer or portions thereof.

In operation, a first surface of the terminal 208 and a second surface opposite the first surface of the terminal 208 are electrically coupled to, respectively, a current source and a current sink, or vice versa. A voltage gradient between the current source and the current sink induces electrical current to flow through the terminal 208. The terminal 208 is coupled to the connector 204 via the spacer 210, the ceramic insulator 202, the first seal 212, the second seal 214, and the third seal 216. However, despite this coupling, the ceramic insulator 202 electrically isolates the terminal 208 from the connector 204. Electrical current is therefore constrained to flow through the terminal 208, which is electrically conductive. It will be appreciated that the connector 204 can be configured to allow incorporation of the electrical feedthrough 200 into thin-walled bodies or shells, such as that depicted in FIG. 2. Such thin-walled bodies or shells may be applicable to batteries where low weight is desired.

Figure 3:
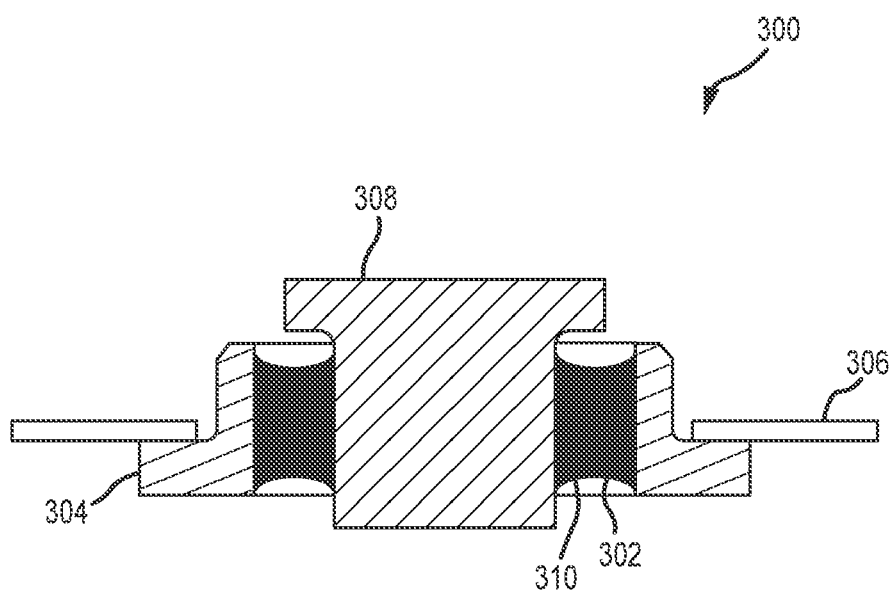
FIG. 3 is a cross-sectional view of an electrical feedthrough having a glass seal for electrical insulation, according to an illustrative embodiment.

Now referring to FIG. 3, a cross-sectional view is presented of an electrical feedthrough 300 having a glass seal 302 for electrical insulation, according to an illustrative embodiment. The electrical feedthrough 300 includes a connector 304 for coupling to a housing 306. The connector 304 is shaped to mate with an orifice that traverses the housing 306. Such mating may be assisted by bonding (e.g., soldering, brazing, welding, epoxying, etc.) that hermetically seals the connector 304 to the housing 306. The connector 304 may include throughhole (e.g., formed as a ferrule) although other geometries are possible. In some embodiments, the connector 304 is formed of a stainless steel. In further embodiments, the stainless steel is selected from the group consisting of stainless steel 304, stainless steel 316, and stainless steel 316L. In some embodiments, the connector 304 is coupled to the housing 306. FIG. 3 depicts the housing 306 as a shell, although this depiction is not intended as limiting. In embodiments where the housing 306 is a shell, the shell may be a stainless steel shell. In further embodiments, the housing 306 contains a battery therein.

The electrical feedthrough 300 also includes a terminal 308 disposed in the connector 304 and formed of a metal selected from the group consisting of titanium, molybdenum, tungsten, and an iron-nickel-cobalt alloy (e.g., Kovar). The terminal 308 is shaped to allow coupling to the connector 304 via the glass seal 302. In embodiments where the connector 304 is coupled to the housing 306 and the housing 306 contains the battery therein, the terminal 308 may be electrically-coupled to a cathode of the battery.

The electrical feedthrough 300 additionally includes a seal 310 coupling the connector 304 to the terminal 308. The seal 310 bridges a gap between the connector 304 and the terminal pin 308 to form the glass seal 302, which may be a hermetic seal. The seal 310 includes a boroaluminate glass that incorporates a boron oxide material (e.g., $B_2O_3$) and an aluminum oxide material (e.g., $Al_2O_3$). For example, and without limitation, the boroaluminate glass may contain 35-45 weight percent of boron oxide and 25-35 weight percent of aluminum oxide. In another non-limiting embodiment, the boroaluminate glass may contain 30-50 weight percent of boron oxide and 10-25 weight percent of aluminum oxide. Other weight percents for the boroaluminate glass are possible. The boroaluminate glass also incorporates complementary oxide materials, whether individually or in combination, such that a total weight percent sums to 100 weight percent. Such complementary oxide materials include magnesium oxide, calcium oxide, strontium oxide, barium oxide, titanium oxide, zirconium oxide, molybdenum oxide, tungsten oxide, iron oxide, nickel oxide, and cobalt oxide. Other oxide materials are possible. In general, the boroaluminate glass is an amorphous insulator and may exhibit a resistivity greater than $10^9$ Ω-cm. In some embodiments, the boroaluminate glass includes barium oxide. In such embodiments, the boroaluminate glass may be a BaBAl-1 glass. In some embodiments, the boroaluminate glass includes calcium oxide. In these embodiments, the boroaluminate glass may be a CaBAl-12 glass.

In operation, a first surface of the terminal 308 and a second surface opposite the first surface of the terminal 308 are electrically coupled to, respectively, a current source and a current sink, or vice versa. A voltage gradient between the current source and the current sink induces electrical current to flow through the terminal 308. Such electrical current flows along the voltage gradient from higher voltage to lower voltage. The terminal pin 308 is coupled to the connector 304 via the glass seal 302. However, despite this coupling, the glass seal 302, being an amorphous insulator, electrically isolates the terminal 308 from the connector 304. Electrical current is therefore constrained to flow through the terminal 308, which is electrically conductive. It will be appreciated that the connector 304 can be configured to allow incorporation of the electrical feedthrough 300 into thin-walled bodies or shells, such as that depicted in FIG. 3. Such thin-walled bodies or shells may be applicable to batteries where low weight is desired.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

What is claimed is:

1. An electrical feedthrough comprising:
   a ceramic insulator;
   a connector for coupling the ceramic insulator to a housing;
      wherein the connector comprises a cylindrical body with a central opening for receiving the ceramic insulator, the connector further comprising a lip surrounding the cylindrical body, the lip comprising an inner surface for bonding to the housing;
      wherein the housing has a thickness that is less than a thickness of the connector;
   a terminal disposed within the ceramic insulator;
   a spacer disposed between the ceramic insulator and the terminal;
   a first seal coupling the ceramic insulator to the connector, the first seal formed from a first braze alloy capable of bonding the ceramic insulator and the connector;
   a second seal coupling the ceramic insulator to the spacer, the second seal formed from a second braze alloy capable of bonding the ceramic insulator and the spacer; and
   a third seal coupling the terminal to the spacer, the third seal formed from a third braze alloy capable of bonding the terminal and the spacer.

2. The electrical feedthrough of claim 1, wherein the connector is formed of an iron-cobalt-nickel alloy.

3. The electrical feedthrough of claim 1, wherein the terminal comprises an aluminum alloy.

4. The electrical feedthrough of claim 1, wherein the spacer comprises an iron-cobalt-nickel alloy.

5. The electrical feedthrough of claim 1, wherein the first braze alloy, the second braze alloy, and the third braze alloy comprise a gold alloy having alloying elements not exceeding 50 weight percent in total.

6. The electrical feedthrough of claim 1, wherein the connector, the terminal, the spacer, or combinations thereof, have at least corresponding portions that are coated with a nickel layer.

7. The electrical feedthrough of claim 6, wherein a gold layer is disposed over the nickel layer or portions thereof.

8. The electrical feedthrough of claim 1, wherein the terminal is electrically connected to a battery.

9. A battery comprising:
   a set of layers comprising a cathode layer, an anode layer, and a separator layer disposed between the cathode layer and the anode layer;
   an enclosure enclosing the set of layers;
   a feedthrough comprising:
      a ceramic insulator;
      a connector for coupling the ceramic insulator to a housing;
         wherein the connector comprises a cylindrical body with a central opening for receiving the ceramic insulator, the connector further comprising a lip surrounding the cylindrical body, the lip comprising an inner surface for bonding to the housing;
         wherein the housing has a thickness that is less than a thickness of the connector;
      a terminal disposed within the ceramic insulator;
      a spacer disposed between the ceramic insulator and the terminal;
      a first seal coupling the ceramic insulator to the connector, the first seal formed from a first braze alloy capable of bonding the ceramic insulator and the connector;

a second seal coupling the ceramic insulator to the spacer, the second seal formed from a second braze alloy capable of bonding the ceramic insulator and the spacer; and a third seal coupling the terminal to the spacer, the third seal formed from a third braze alloy capable of bonding the terminal and the spacer.

10. The battery of claim 9, wherein the connector is formed of an iron-cobalt-nickel alloy.

11. The battery of claim 9, wherein the terminal comprises an aluminum alloy.

12. The battery of claim 9, wherein the spacer comprises an iron-cobalt-nickel alloy.

13. The battery of claim 9, wherein the first braze alloy, the second braze alloy, and the third braze alloy comprise a gold alloy having alloying elements not exceeding 50 weight percent in total.

14. The battery of claim 9, wherein the connector, the terminal, the spacer, or combinations thereof, have at least corresponding portions that are coated with a nickel layer.

15. The battery of claim 14, wherein a gold layer is disposed over the nickel layer or portions thereof.

16. A method for manufacturing a feedthrough, the method comprising:

coupling a ceramic insulator to a housing using a connector, wherein the connector comprises a cylindrical body with a central opening for receiving the ceramic insulator, the connector further comprising a lip surrounding the cylindrical body, the lip comprising an inner surface for bonding to the housing, wherein the housing has a thickness that is less than a thickness of the connector;

disposing a terminal within the ceramic insulator;

disposing a spacer between the ceramic insulator and the terminal;

coupling the ceramic insulator to the connector using a first seal, the first seal formed from a first braze alloy capable of bonding the ceramic insulator and the connector;

coupling the ceramic insulator to the spacer using a second seal, the second seal formed from a second braze alloy capable of bonding the ceramic insulator and the spacer; and coupling the terminal to the spacer using a third seal, the third seal formed from a third braze alloy capable of bonding the terminal and the spacer.

17. The method of claim 16, wherein the connector is formed of an iron-cobalt-nickel alloy.

18. The method of claim 16, wherein the terminal comprises an aluminum alloy.

19. The method of claim 16, wherein the spacer comprises an iron-cobalt-nickel alloy.

20. The method of claim 16, wherein the first braze alloy, the second braze alloy, and the third braze alloy comprise a gold alloy having alloying elements not exceeding 50 weight percent in total.

* * * * *